Feb. 20, 1962　　　E. R. ODOM　　　3,021,599
COMBINATION TOOL
Filed June 10, 1960
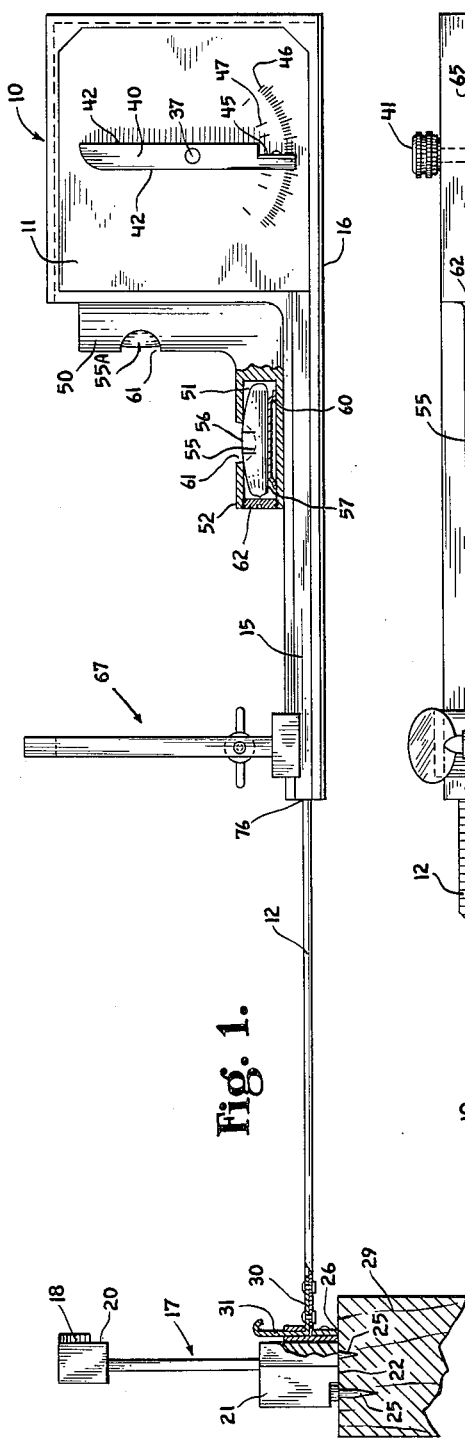
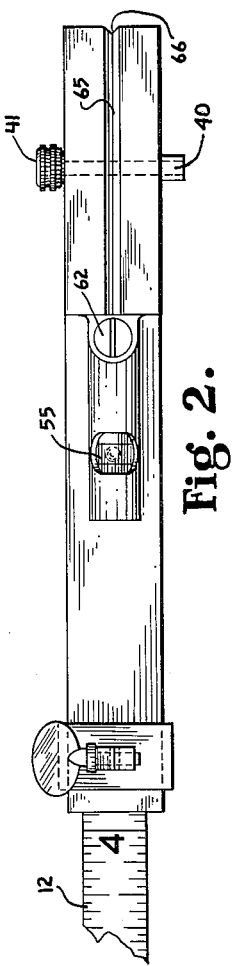
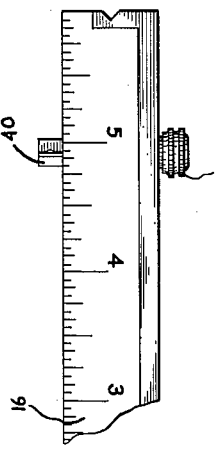
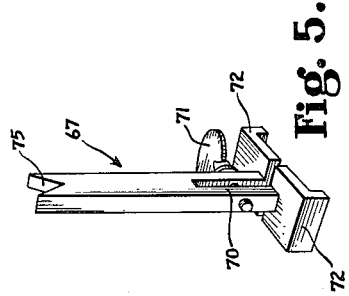
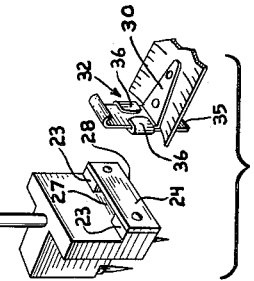
INVENTOR.
EARL R. ODOM
BY
Lockwood Woodard, Smith & Weikart
ATTORNEYS

United States Patent Office 3,021,599
Patented Feb. 20, 1962

3,021,599
COMBINATION TOOL
Earl R. Odom, 438 W. Olive Ave., Monrovia, Calif.
Filed June 10, 1960, Ser. No. 35,223
5 Claims. (Cl. 33—46)

The present invention relates to a combination tool or measuring device for measuring distances and angles, for locating a point at a predetermined distance from a reference point either above or below, or horizontally spaced from the reference point or a combination of these and to certain subcombinations of the combination tool.

A primary object of the invention is to provide a measuring device which allows a single person to "square up" a location while, for example, putting in a foundation. In other words, it is an object of this invention to provide a measuring device facilitating or making possible one person locating a point a predetermined distance in a horizontal plane from a reference point.

Another object of this invention is to provide an improved measuring device.

Still another object of the invention is to provide a combination tool or measuring device facilitating or making possible one person locating a point a predetermined distance from a reference point, the distance being measured along a line which is at a predetermined angle to the horizontal or vertical.

A further object of the invention is to provide a measuring tape incorporating novel means for attaching the end of the tape to a reference point, said attaching means being so designed as not to prevent accurate measurement when the attaching means is not being used and to allow the tape to be held closely against the reference point when the attaching means is not being used.

Still another object of the invention is to provide a measuring device incorporating a novel level vial arrangement.

Related objects and advantages will become apparent as the description proceeds.

In accordance with the present invention, there is provided a measuring device including a casing having a flat, elongated base. The casing has a tape coiled therein and is formed to dispense the tape parallel to the base. The casing carries sighting means defining a line of sight parallel to the length of the base. The device also includes a target unit and means for securing the target unit to a reference point. The target unit has a target positioned thereon as to be spaced from the reference point a distance equal to the spacing of the line of sight from the base. There is also provided means for detachably connecting the end of the tape to the target unit and means carried by the casing for indicating when the base is horizontal and vertical.

The full nature of the invention will be understood from the accompanying drawings and the following description and claims.

FIG. 1 is a side elevation, partially in section, of a measuring device or combination tool embodying the present invention.

FIG. 2 is a fragmentary top plan view of the measuring device of FIG. 1.

FIG. 3 is a fragmentary bottom view of the measuring device.

FIG. 4 is a perspective view of a target element and the end of a measuring tape both of which form a portion of the measuring device.

FIG. 5 is a perspective view of an intermediate sighting unit forming a part of the measuring device.

Referring now more particularly to the drawings, there is illustrated a measuring device including a casing 10 which has a generally square shaped portion 11 forming a housing for a coil of measuring tape 12 and which also has a straight, elongated, generally flat, tubular guide portion 15 through which the tape 12 may be withdrawn from the housing 11. The casing 10 has a flat, elongated base 16 which forms a part of the tubular guide portion 15 and is inscribed with suitable markings and indicia so as to provide a measuring rule. The base 16, for example, may have a length of six inches and be suitably marked off in inches and fractions of the inches.

The measuring device also includes a target unit 17 which is formed with a target 18 having a downwardly pointing V-shape. The portion 20 of the target unit adjacent to the target may be colored to contrast with the target 18 to facilitate sighting upon the target. The target element has a base 21 defining a flat lower surface 22. The base is formed with two stubby projections 23 which have secured thereto a horizontally extending strap 24, the projections and strap being arranged to define a vertically extending flat aperture 27. Extending from the bottom of the base 21 of the target unit are a plurality of needles or pointers 25 adapted to pierce wood and other relatively soft substances. Thus, assuming that the reference point or line to be measured from is at 26 on the wood unit 29, the target element 17 may be secured to the wood element by forcing the needles 25 into the element with the lower edge 28 of the base 21 in alignment with the line or point on the wood element.

The tap 12, which is a conventional metal tape having a part cylindrical curved shape all along its length, has secured to its end a J-shaped element 30 which has a portion 31 extending upwardly and perpendicularly from the tape. A connecting element 32 is slidably received upon the perpendicular portion 31 and consists of a generally rectangular plate-like element 35 having a pair of ears 36 extending from the opposite sides thereof and bent around the projecting portion 31. The ears 36 are located at the upper end of the rectangular portion 35 and are so proportioned and arranged as to allow the connecting element 32 to be freely slidable upon the projecting portion 31 yet to retain the connecting element in parallel relation to the projecting portion 31.

The plate-like portion 35 of the slidable element has a somewhat lesser thickness and width than the aperture 27 of the target unit so that the plate-like portion 35 may be dropped within the aperture 27 as illustrated in FIG. 1 to connect the end of the tape to the target unit. The various parts are so proportioned and arranged that when such a connection is made, the various distance readings upon the tape recite the precise distance from the line at 26 on the wood element 29.

Assuming now that it is desired to use the tape 12 without the target unit 17, the connecting element 32 does not interfere with the accuracy of the tape. Because of the fact that the connecting element is slidable upon the J-shaped element 30, the lower surface of the tape 12 may be placed against the reference point to be measured from with the end of the tape in alignment with the reference point and the connecting element will slide upwardly on the projecting portion 31 to allow the tape to engage the object being measured.

A shaft 37 extends through the casing 10 at the axis of the coil of tape and has fixed on one end an arm 40, the shaft being pivotal upon the casing in order to allow pivoting of the arm 40. At the opposite end of the shaft 37 is a knurled nut 41 threadedly received upon the shaft and operable to tighten the arm 40 against the casing and to lock it at a desired angle with relation to the base 16. The arm 40 has opposite straight, flat sides 42 and has a flat surface 45 which functions as an indicator designating various ones of markings 46 and 47 carried by the casing 10. The markings 46 may be, for example, even degrees and the markings 47 may be, for example, 1, 3, 5, 15 and 22½ degrees which angles are commonly used by mechanics. It should be noted that the flat surface 45 is arranged radially to the axis of the shaft 37.

Formed integrally with a portion of the casing 10 is an L-shaped projection 50 having perpendicular bores 51 therethrough, the bores being threaded at the opposite ends of the L-shaped projection 50. Because both of the bores 51 and associated bubble levels are identical, only one bubble level has been shown in section in FIG. 1. A level vial 55 having a curved upper surface 56 and a straight lower surface 57 is received within the bore 51. An identical vial 55A is received in the other bore 51. Each vial 55 has a part cylindrical spring 60 partially surrounding the vial at the straight side thereof and urging the vial and its curved surface toward a sighting aperture 61 intersecting each bore 51. Suitable cement may be received within each of the bores 51 to hold the vials 55 and 55A in place. It can be appreciated that the assembly of the bubble levels comprising the vials 55 and 55A will be facilitated because the spring 60 will urge the vial into proper position toward the viewing aperture 61 while the cement for holding the vial in place is hardening. Each of the bores 51 is closed at its end 52 by suitable screw 62 threadedly received within the bore.

The casing 10 is formed with a V-shaped groove 65 which projects toward the base 16 and extends in parallel relation and longitudinally thereof. A groove 66 connects the groove 65 with the base 16, is perpendicular to both the groove 65 and the base and has the same V-shape as the groove 65.

Detachably mounted upon the extending end of the flat, tubular guide 15 is an intermediate sighting unit 67 having a bifurcated lower portion 70 which receives a thumb screw 71. The intermediate sighting unit is mounted upon the tubular portion 15 by means of downwardly extending flanges 72 which engage the sides of the tubular portion 15 and are held thereagainst by the thumb screw 71. The intermediate sighting unit may be removed from the casing 10 by unthreading the thumb screw 71. Formed at the upper end of the unit 67 is a V-shaped groove 75 which points toward the base 16 identically to the groove 65, is spaced equally from the base as the groove 65 and is in alignment with the groove 65. It should be noted that the target 18 has a similar V-shape to the grooves 65 and 75 and is spaced from the bottom 22 of the base 21 a distance equal to the spacing of the grooves 65 and 75 from the base 16.

Assuming now that it is desired to locate a point at a predetermined relatively great distance and in a horizontal plane from a reference point or line located at 26 on the wood member 27, the connecting element 32 is inserted within the aperture 27 and the casing 10 pulled away from the target unit until the tape at the open end of the tubular guide 15 (point 76) is read to determine whether the predetermined distance has been set off. In order to correctly set off the predetermined distance, the length of the base 16 should be added inasmuch as the groove 66 in the casing is used to mark the point. The bubble vial 55 is leveled causing the base 16 to be arranged in a horizontal plane and the user of the device sights along the grooves 65 and 75 so as to bring the target 18 into alignment therewith. The user then makes a pencil mark upon the object being measured by sliding a pencil along the groove 66 until it meets the object at the base 16 and the point is located.

Assuming now that it is desired to locate a point at a predetermined relatively great distance and in a vertical plane from a reference point, the procedure above described is repeated with certain minor exceptions. It can be appreciated that the target unit 17 should have its target 18 facing downwardly. Also, the bubble level 55A is leveled instead of the bubble level 55. In most other respects, however, the vertical measurement is identical to the horizontal measurement above described.

Assume now that it is desired to locate a point at a predetermined distance from a reference point, the distance being measured along a line which is at a predetermined angle to the horizontal or vertical. The desired angle is set by releasing the thumb nut 41, positioning the arm 40 at the desired angle and retightening the thumb nut 41. One of the straight sides 42 of the arm 40 is placed against a vertical or horizontal member at the reference point and the tape 12 is extended the desired distance with the target unit connected to the end of the tape. The user may locate the reference point by sighting along the grooves 65 and 75 and sighting the target unit 18 with the tape extended the desired distance.

From the above illustrations, it can be appreciated that the present invention is capable of many different types of measurements only a few of which have been specifically described. From the above description, it can be appreciated that the present invention provides an improved measuring device facilitating or making possible one person locating a point a predetermined distance in a horizontal or vertical plane from a reference point. It can also be appreciated that the present invention provides a novel means for attaching the end of a tape to a reference point so as to allow the user of the tape to extend the tape for measuring and to permit the user to move away from the reference point during such measuring.

While the invention has been disclosed and described in some detail in the drawings and foregoing description, they are to be considered as illustrative and not restrictive in character, as modifications may readily suggest themselves to persons skilled in this art and within the broad scope of the invention. For example, one alternative to the invention right comprise the making of the base 21 of the target unit from a magnetic material and eliminating the pointers or spikes 25. This embodiment would be useful when the reference point is located upon iron or other magnetic material.

The invention claimed is:

1. A measuring device comprising a casing having a flat, elongated base, a tape coiled within said casing, said casing being formed to dispense the tape parallel to said base, said casing carrying sighting means definiing a line of sight parallel to the length of said base, a target unit, means for securing said target unit to a reference point, said target unit having a target positioned thereon in such a manner as to be spaced from said reference point a distance equal to the spacing of said line of sight from said base, means for detachably connecting the end of said tape to said target unit, and means carried by said casing for indicating when said base is horizontal and vertical.

2. A measuring device comprising a casing having a flat, elongated base, a tape coiled within said casing, said casing being formed to dispense the tape parallel to said base, said casing carrying sighting means defining a line of sight parallel to the length of said base, a target unit, means for securing said target unit to a reference point, said target unit having a target positioned thereon in such a manner as to be spaced from said reference point a distance equal to the spacing of said line of sight from said base, means for detachably connecting the end of said tape to said target unit, means carried by said casing for indicating when said base is horizontal and vertical, an arm pivoted on said casing for pivoting in a plane parallel to the length of said base, said arm defining a straight edge, and indicia carried by said casing indicating the angle of said arm with respect to said base.

3. A measuring device as defined in claim 2 in which said sighting means comprises a groove in said casing, an intermediate sighting unit, said casing having a straight, elongated, flat, tubular guide portion incorporating said base and through which said tape is dispensed, said intermediate sighting unit being detachably securable to the distal end of said tubular portion and having a groove which may be aligned with said first mentioned groove and target, said second mentioned groove being so located that alignment of said grooves and target projects said base toward said reference point, said grooves and target each having a V-shape pointing towards said base and reference point.

4. A measuring device as defined in claim 2 in which said means for detachably connecting the tape to said target unit comprises, a J-shaped element secured to said tape at the end thereof and extending perpendicularly thereof away from said base, a connecting element slidably mounted on said J-shaped element for movement perpendicularly of said tape, said target unit having a slot therein adapted to receive said slidable connecting element, said slidable connecting element being movable along said J-shaped element to a position in which it projects on the other side of said tape from the surface of said tape which is toward said base.

5. A measuring device comprising a casing having a flat, elongated base, a tape coiled within said casing, said casing being formed to dispense the tape parallel to said base, said casing carrying sighting means defining a line of sight parallel to the length of said base, a target unit, means for securing said target unit to a reference point, said target unit having a target positioned thereon in such a manner as to be spaced from said reference point a distance equal to the spacing of said line of sight from said base, means for detachably connecting the end of said tape to said target unit, a pair of level vials carried by said casing for indicating when said base is horizontal and vertical, said vials having a curved top portion and a flat bottom portion, said casing being formed with bores receiving said vials, reading apertures intersecting said bores, said vials having their curved top portions toward said apertures and visible therethrough, springs received in said bores and urging said vials toward said reading apertures between the surface thereof and said flat bottom portion of said vials, cement holding said vials in place in said bores, an arm pivoted on said casing for pivoting in a plane parallel to the length of said base, said arm defining a straight edge, and indicia carried by said casing indicating the angle of said arm with respect to said base.

References Cited in the file of this patent

UNITED STATES PATENTS

| 301,869 | Dickinson | July 15, 1884 |
| 913,703 | Darter | Mar. 2, 1909 |
| 1,439,645 | Sell | Dec. 19, 1922 |
| 1,448,931 | Manning | Mar. 20, 1923 |
| 2,942,348 | Caruso | June 28, 1960 |

FOREIGN PATENTS

| 7,905 | Great Britain | May 11, 1889 |
| 825,903 | Germany | Dec. 27, 1951 |
| 830,573 | Germany | Feb. 4, 1952 |
| 158,214 | Sweden | Mar. 19, 1957 |